(12) United States Patent
Sekiguchi

(10) Patent No.: US 10,630,854 B2
(45) Date of Patent: Apr. 21, 2020

(54) IMAGE PROCESSING APPARATUS

(71) Applicant: KYOCERA Document Solutions Inc., Osaka (JP)

(72) Inventor: Yasuhiro Sekiguchi, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/227,448

(22) Filed: Dec. 20, 2018

(65) Prior Publication Data

US 2019/0199878 A1   Jun. 27, 2019

(30) Foreign Application Priority Data

Dec. 26, 2017   (JP) ................................. 2017-250231

(51) Int. Cl.
| | |
|---|---|
| *H04N 1/00* | (2006.01) |
| *G06K 9/00* | (2006.01) |
| *G06F 17/21* | (2006.01) |
| *G06F 17/24* | (2006.01) |
| *H04N 1/40* | (2006.01) |
| *G06F 17/22* | (2006.01) |

(52) U.S. Cl.
CPC ....... *H04N 1/00864* (2013.01); *G06F 17/211* (2013.01); *G06F 17/24* (2013.01); *G06K 9/00469* (2013.01); *H04N 1/00331* (2013.01); *H04N 1/40* (2013.01); *G06F 17/2205* (2013.01); *G06F 17/246* (2013.01); *G06K 9/00442* (2013.01); *G06K 2209/01* (2013.01); *H04N 2201/0094* (2013.01)

(58) Field of Classification Search
CPC .................................................. H04N 1/00864
USPC ......................................................... 358/1.15
See application file for complete search history.

(56) References Cited

U.S. PATENT DOCUMENTS

| | | | | |
|---|---|---|---|---|
| 2009/0164881 A1* | 6/2009 | Segarra | ............... | G06F 21/6245 715/230 |
| 2010/0188684 A1* | 7/2010 | Kumara | ................ | G06F 21/608 358/1.14 |
| 2015/0046488 A1* | 2/2015 | Liao | ..................... | G06F 16/5866 707/769 |

FOREIGN PATENT DOCUMENTS

JP    2008-282149 A    11/2008

* cited by examiner

*Primary Examiner* — Jacky X Zheng
(74) *Attorney, Agent, or Firm* — IP Business Solutions, LLC

(57) ABSTRACT

An image processing apparatus includes: a document reading section that reads an image from an original document; a character recognizing section that preforms processing for subjecting image data obtained by reading of the image by the document reading section to character recognition; a conversion section that performs, using a recognition result of the character recognizing section, conversion of the image data obtained by reading by the document reading section to data available within predetermined application software; and a determination section that determines whether or not a text represented by the recognition result of the character recognizing section contains a predetermined keyword. When the determination section determines that the text contains the predetermined keyword, the conversion section performs the conversion in a limitedly editable format, whereas when the determination section determines that the text does not contain the predetermined keyword, the conversion section performs the conversion in a freely editable format.

6 Claims, 8 Drawing Sheets

CONVERSION TO WORD FORMAT

CONVERSION TO EXCEL FORMAT

CONVERSION TO PDF FORMAT

IMAGE PROCESSING APPARATUS

INCORPORATION BY REFERENCE

This application claims priority to Japanese Patent Application No. 2017-250231 filed on Dec. 26, 2017, the entire contents of which are incorporated by reference herein.

BACKGROUND

The present disclosure relates to image processing apparatuses and particularly relates to a technique for converting image data obtained by scanning to another data format.

Through improvement in OCR (optical character recognition) technique, the contents of image data obtained by scanning an original document on a multifunction peripheral or the like have become able to be edited on a PC (personal computer) by converting the image data to data in a format available within application software, such as spreadsheet software, text editing software or presentation software, and saving the converted data in a file. For example, there is a technique for converting image data obtained by scanning to data available within such application software as described above.

SUMMARY

A technique improved over the aforementioned technique is proposed as one aspect of the present disclosure.

An image processing apparatus according to an aspect of the present disclosure includes a document reading section, a character recognizing section, a conversion section, and a determination section. The document reading section reads an image from an original document. The character recognizing section preforms processing for subjecting image data obtained by reading of the image by the document reading section to character recognition. The conversion section performs, using a recognition result of the character recognizing section, conversion of the image data obtained by reading of the image by the document reading section to data available within predetermined application software. The determination section determines whether or not a text represented by the recognition result of the character recognizing section contains a predetermined keyword. When the determination section determines that the text contains the predetermined keyword, the conversion section performs the conversion of the image data to the data in a limitedly editable format, whereas when the determination section determines that the text does not contain the predetermined keyword, the conversion section performs the conversion of the image data to the data in a freely editable format.

BRIEF DESCRIPTION OF THE DRAWINGS

FIGS. 2A and 2B are views for illustrating an example of data conversion, in which FIG. 2A shows an original document before data conversion and FIG. 2B shows a conversion result obtained by the data conversion.

FIGS. 3A and 3B are views for illustrating another example of data conversion, in which FIG. 3A shows an original document before data conversion and FIG. 3B shows a conversion result obtained by the data conversion.

FIGS. 5A and 5B are views for illustrating still another example of data conversion, in which FIG. 5A shows an original document before data conversion and FIG. 5B shows a conversion result obtained by the data conversion.

FIGS. 7A and 7B are views for illustrating an example of data conversion, in which FIG. 7A shows an original document before data conversion and FIG. 7B shows a conversion result obtained by the data conversion.

FIGS. 8A and 8B are views for illustrating another example of data conversion, in which FIG. 8A shows an original document before data conversion and FIG. 8B shows a conversion result obtained by the data conversion.

DETAILED DESCRIPTION

Figure 1:
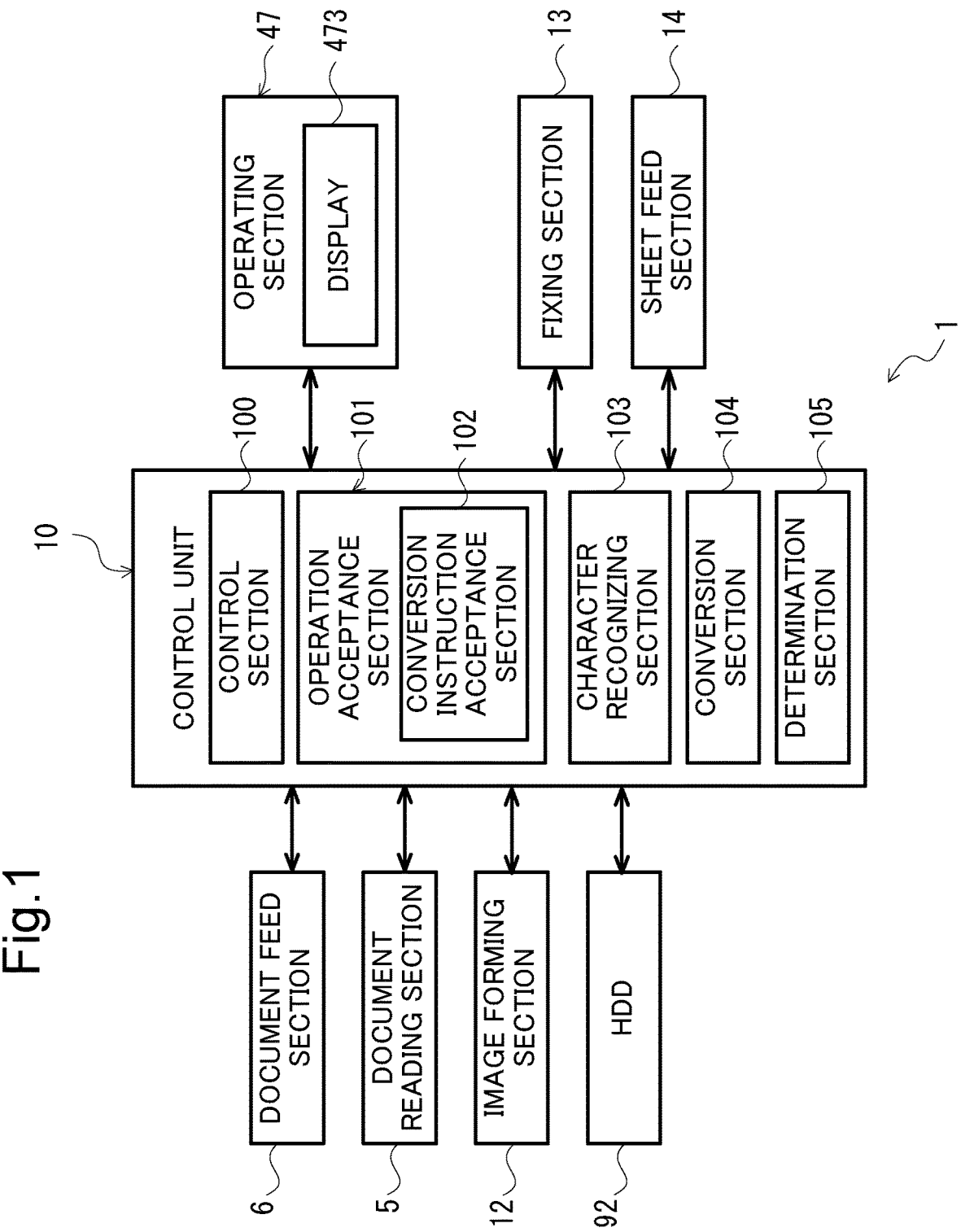
FIG. 1 is a functional block diagram schematically showing an essential internal configuration of an image forming apparatus as one embodiment of an image processing apparatus according to a first embodiment of the present disclosure.

Hereinafter, a description will be given of an image processing apparatus according to an embodiment of the present disclosure with reference to the drawings. FIG. 1 is a functional block diagram schematically showing an essential internal configuration of an image forming apparatus as one embodiment of the image processing apparatus according to the first embodiment of the present disclosure.

An image forming apparatus 1 is a multifunction peripheral having multiple functions including, for example, a copy function, a print function, a scan function, and a facsimile function. The image forming apparatus 1 includes a control unit 10, a document feed section 6, a document reading section 5, an image forming section 12, a fixing section 13, a sheet feed section 14, and an operating section 47.

The following describes how a document reading operation is performed on the image forming apparatus 1. The document reading section 5 optically reads an image of an original document being fed by the document feed section 6 or an image of an original document placed on a platen glass and generates image data from the read image. The image data generated by the document reading section 5 is saved to an unshown image memory or the like.

The following describes how a document forming operation is performed on the image forming apparatus 1. Based on the image data generated by the document reading operation, image data received from a network-connected computer as an external device or other data, the image forming section 12 forms a toner image on a recording paper sheet fed from the sheet feed section 14 and serving as a recording medium.

The fixing section 13 fixes the toner image on the recording paper sheet. The recording paper sheet subjected to the fixation processing is discharged to a sheet output tray. The sheet feed section 14 includes a sheet feed cassette.

The operating section 47 accepts operator's instructions for various types of operations and processing executable by the image forming apparatus 1, such as an instruction to perform an image forming operation. The operating section 47 includes a display 473 that displays operation guidance and so on for the operator. The display 473 forms a touch panel, through which the operator can touch buttons and keys displayed on the screen to operate the image forming apparatus 1.

The control unit 10 is made up by including a processor, a RAM (random access memory), a ROM (read only memory), and a dedicated hardware circuit. The processor is, for example, a CPU (central processing unit), an ASIC (application specific integrated circuit) or an MPU (micro processing unit). The control unit 10 includes a control section 100, an operation acceptance section 101, a character recognizing section 103, a conversion section 104, and a determination section 105.

The control unit 10 functions as the control section 100, the operation acceptance section 101, the character recognizing section 103, the conversion section 104, and the determination section 105 by the operation in accordance with a control program stored in an HDD (hard disk drive) 92. However, each of the above-mentioned control section 100 and other sections may not be implemented by the operation of the control unit 10 in accordance with the control program but may be constituted by a hardware circuit. Hereinafter, the same applies to the other embodiment unless otherwise stated.

The control section 100 governs the overall operation control of the image forming apparatus 1. The control section 100 is connected to the document feed section 6, the document reading section 5, the image forming section 12, the fixing section 13, the sheet feed section 14, and the operating section 47 and controls the operations and others of these components.

The operation acceptance section 101 accepts a user's input of an operation through the operating section 47. The operation acceptance section 101 includes a conversion instruction acceptance section 102. The conversion instruction acceptance section 102 accepts a conversion instruction to covert the image data obtained by reading of the image by the document reading section 5 to a data format (for example, data in Excel format, data in Word format or data in PPT format) available within predetermined application software (for example, spreadsheet software, text editing software or presentation software).

The character recognizing section 103 subjects the image data obtained by reading of the image by the document reading section 5 to character recognition processing, such as OCR (optical character recognition) processing.

When the conversion instruction acceptance section 102 accepts the above conversion instruction, the conversion section 104 converts, using the recognition result of the character recognizing section 103, the image data obtained by reading of the image by the document reading section 5 to data (for example, data in Excel format, Word format or PPT format) available within the predetermined application software according to the contents indicated by the conversion instruction. The conversion section 104 previously stores the predetermined application software or at least application software for conversion to data available within the predetermined application software.

Figure 2A:
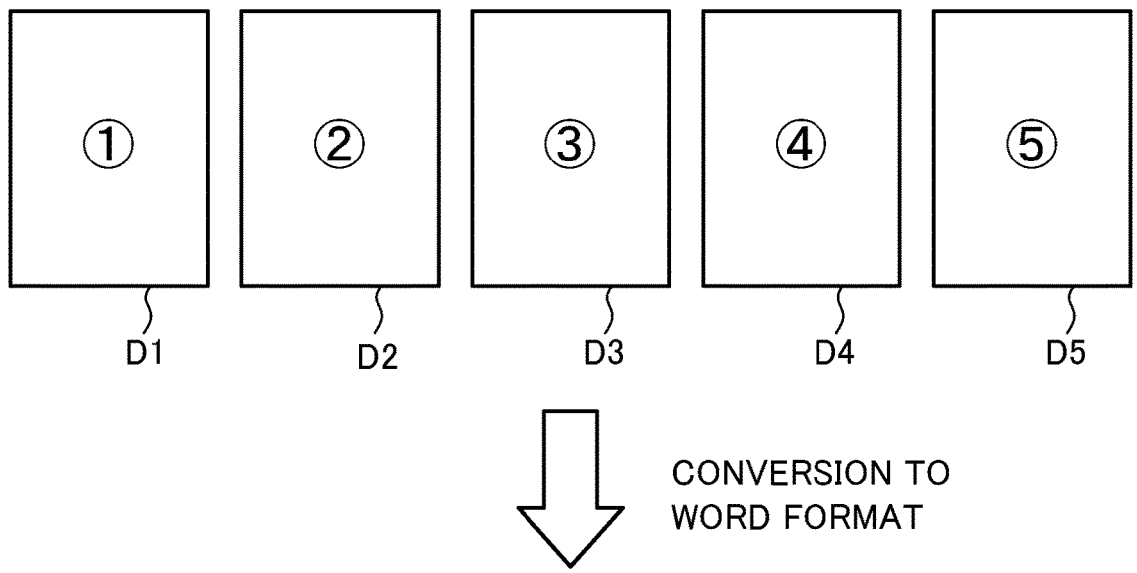
Figure 2B:
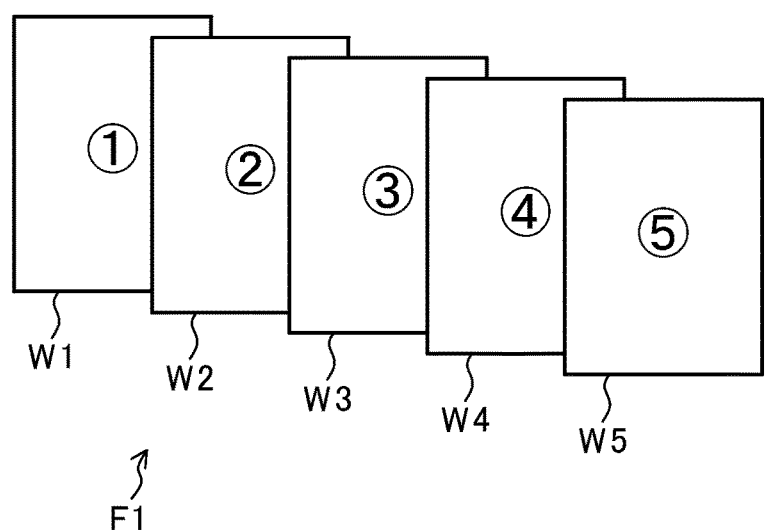

For example, as shown in FIG. 2A, when the document reading section 5 is allowed to read an original document of five pages D1 to D5, for example, in Jpeg format and the conversion instruction acceptance section 102 accepts a conversion instruction to convert the read data to data in Word format, the conversion section 104 converts the image data on all the original document pages D1 to D5 to data in Word format and creates Word texts W1 to W5 obtained by the data conversion as a single file F1 as shown in FIG. 2B. Then, the control section 100 saves the file F1 on the HDD 92.

Figure 3A:
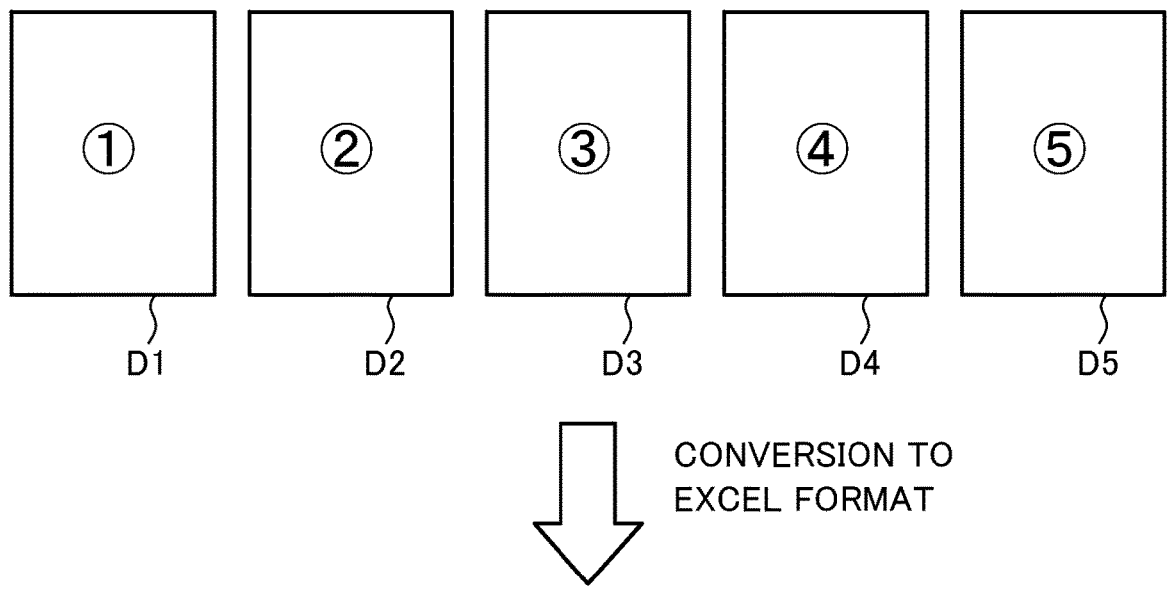
Figure 3B:
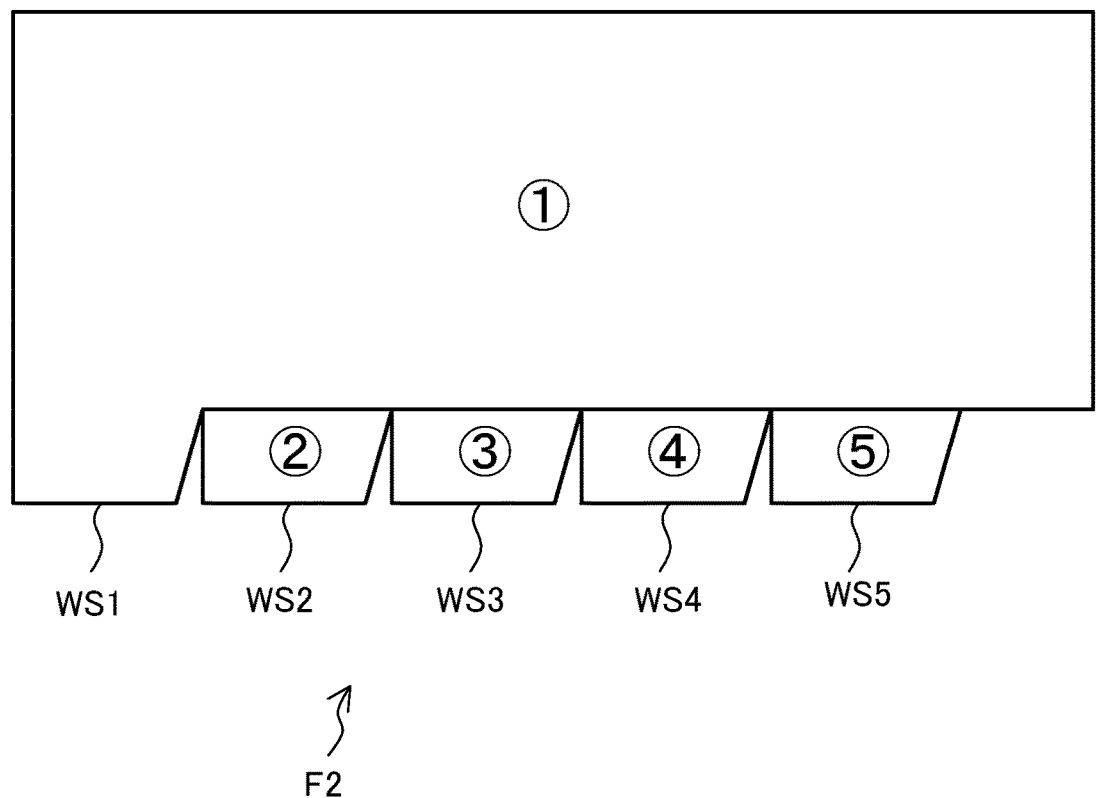

For another example, as shown in FIG. 3A, when the document reading section 5 is allowed to read an original document of five pages D1 to D5 and the conversion instruction acceptance section 102 accepts a conversion instruction to convert the read data to data in Excel format, the conversion section 104 converts the image data on all the original document pages D1 to D5 to data in Excel format and creates worksheets WS1 to WS5 of an Excel document obtained by the data conversion as a single file F2 as shown in FIG. 3B. Then, the control section 100 saves the file F2 on the HDD 92.

The determination section 105 determines whether or not a text represented by the recognition result of the character recognizing section 103 contains a predetermined keyword. The predetermined keyword is, for example, a keyword having the contents indicating that the document is confidential, such as "Secret", "Sensitive", "Classified", "Internal Use Only" or "Confidential". In other words, the predetermined keyword is a sequence of characters that means a request for confidentiality.

When the determination section 105 determines that the above text contains the predetermined keyword, the conversion section 104 performs the above conversion in a limitedly editable format. On the other hand, when the determination section 105 determines that the above text does not contain the predetermined keyword, the conversion section 104 performs the above conversion in a freely editable format.

Figure 4:
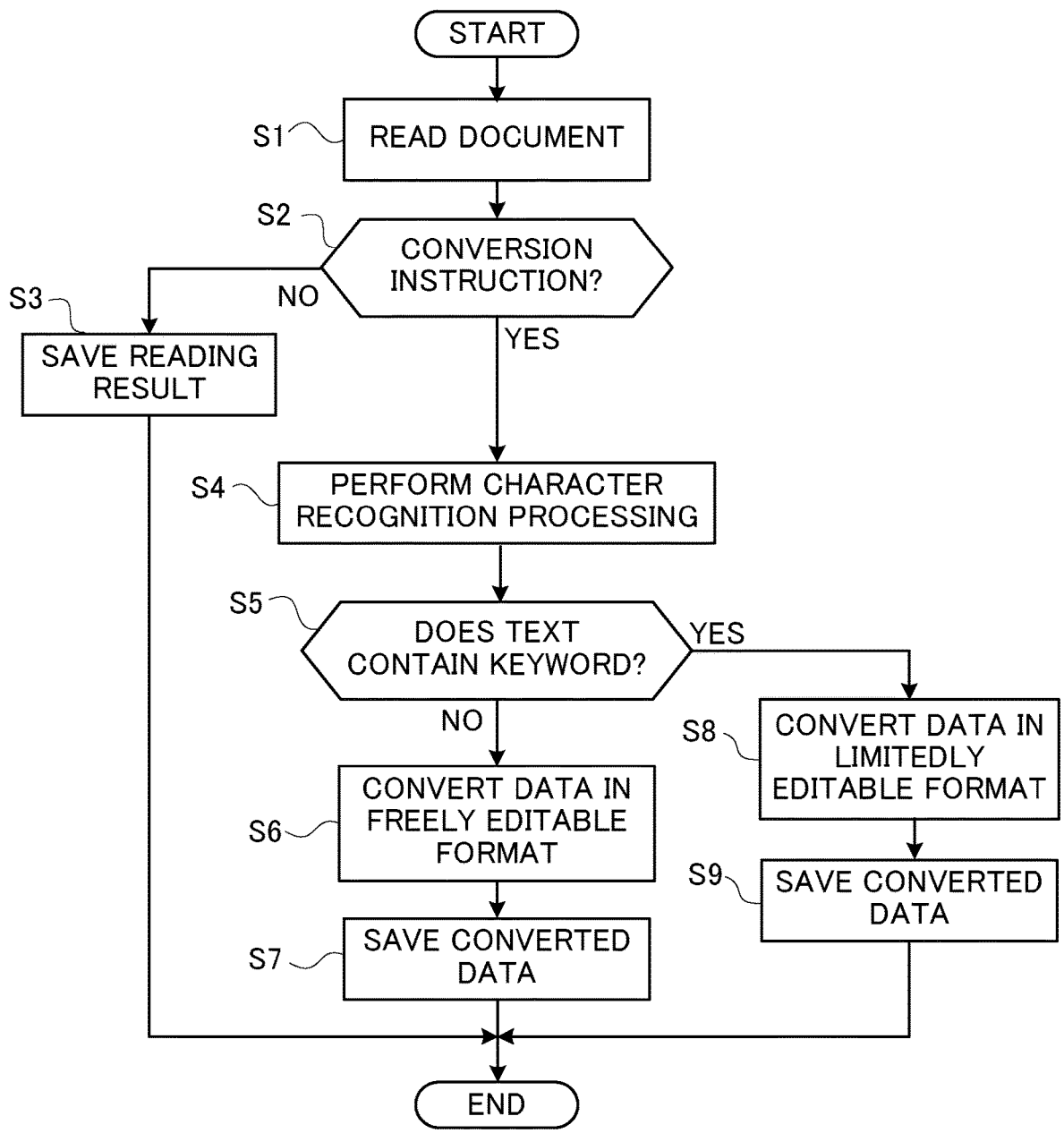
FIG. 4 is a flowchart showing an example of processing performed by a control unit of the image forming apparatus according to the first embodiment.

Next, a description will be given of an example of processing performed by the control unit 10 of the image forming apparatus 1 according to the first embodiment with reference to a flowchart shown in FIG. 4.

When the operation acceptance section 101 accepts an instruction to start scanning an original document through the operating section 47 from the user, the control section 100 controls the operation of the document reading section 5 to allow the document reading section 5 to read an image of the original document (S1).

Subsequently, the control section 100 determines whether or not the conversion instruction acceptance section 102 has accepted such a conversion instruction as described above from the user (S2). When determining that the conversion instruction acceptance section 102 has not accepted the conversion instruction (NO in S2), the control section 100 saves image data obtained by reading of the image by the document reading section 5 on the HDD 92 (S3). Then, processing ends.

On the other hand, when the control section 100 determines that the conversion instruction acceptance section 102 has accepted the conversion instruction (YES in S2), the character recognizing section 103 subjects the image data obtained by reading of the image by the document reading section 5 to character recognition processing, such as OCR processing (S4). Subsequently, the determination section 105 determines whether or not a text represented by the recognition result of the character recognizing section 103 contains such a predetermined keyword as described above (S5).

When the determination section 105 determines that the text does not contain the keyword (NO in S5), the conversion section 104 converts, based on the recognition result of the character recognizing section 103, the image data obtained by reading of the image by the document reading section 5 to data available within application software specified by the user and taking a freely editable format, according to the conversion instruction accepted by the conversion instruction acceptance section 102 (S6). The control section 100 saves the data (for example, Word texts W1 to W5 shown in FIG. 2B) obtained by the data conversion by the conversion section 104 on the HDD 92 (S7). Then, processing ends.

On the other hand, when the determination section 105 determines that the text represented by the recognition result of the character recognizing section 103 contains the keyword (YES in S5), the conversion section 104 converts the image data obtained by reading of the image by the document reading section 5 to data available within the application software specified by the user but taking a limitedly editable format (S8). Then, the control section 100 saves the data obtained by the data conversion on the HDD 92 (S9). Then, processing ends.

Figure 5A:
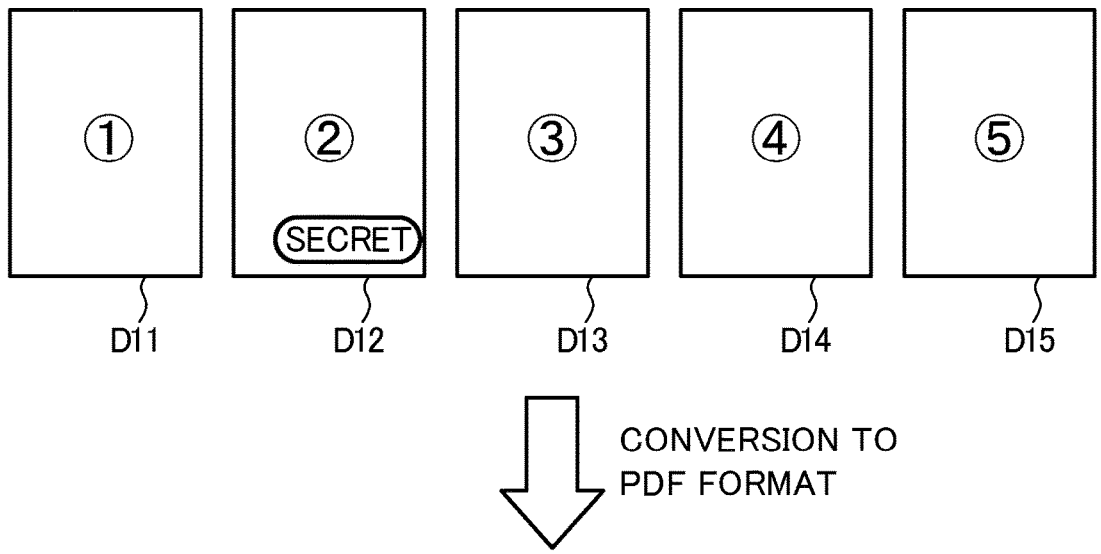
Figure 5B:
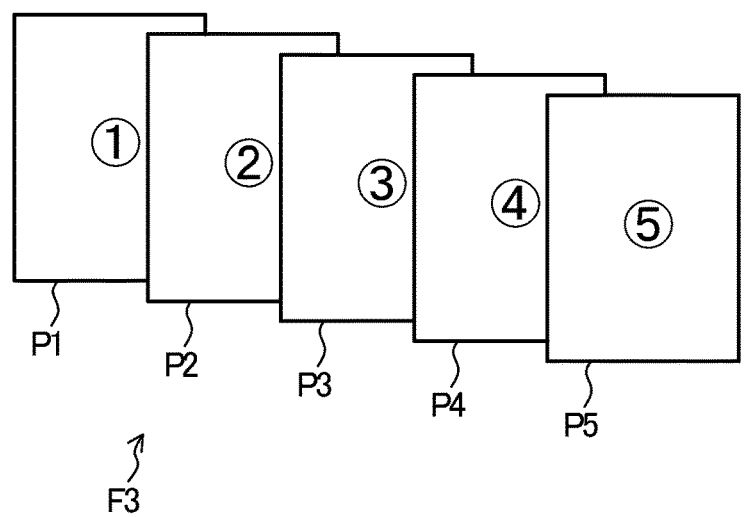

For example, suppose that, as shown in FIG. 5A, in allowing the document reading section 5 to read an original document of five pages D11 to D15 in which the second original document page D12 contains a word "Secret", the conversion instruction acceptance section 102 has accepted a conversion instruction for conversion to data in Word format. In this case, in S8 above, as shown in FIG. 5B, the conversion section 104 converts image data on all the original document pages D11 to D15 obtained by reading by the document reading section 5 to data in a format difficult to edit, for example, in PDF (portable document format), and creates PDF documents P1 to P5 obtained by the data conversion as a single file F3. In S9 above, the control section 100 saves the file F3 on the HDD 92.

Although the above description has been given of the case where the conversion section 104 converts the image data on original document pages D11 to D15 obtained by reading by the document reading section 5 to data in PDF format, the conversion section 104 may convert the image data, not to data in PDF format, but to data in any other hard-to-edit format, such as data in an image format (for example, data in Jpeg format).

There is no particular limitation placed on the manner of data conversion in a limitedly editable format performed by the conversion section 104 in S8. Apart from the manner described above, one of the following manners (1) and (2) may be used. Furthermore, the conversion section 104 may use, among the manner of data conversion described above and the following manners (1) and (2), the manner of data conversion selected through the operating section 47 by the user (administrator user).

(1) In converting the read data to data (for example, Word texts W1 to W5 shown in FIG. 2B or worksheets WS1 to WS5 of an Excel document shown in FIG. 3B) available within the above application software, the conversion section 104 converts the read data to read-only data.

(2) In converting the read data to data available within the above application software, the conversion section 104 converts the read data to data for which a password is set (for example, previously set by the administrator user).

According to the first embodiment above, if an original document contains a predetermined keyword, for example, "Internal Use Only", "Secret" or "Confidential" (i.e., if free edition is unfavorable for the original document), image data obtained by reading of the original document by the document reading section 5 is converted to data available within the above application software but taking a limitedly editable format. Thus, as for such an original document containing the predetermined keyword, its converted data can take a highly versatile data format available within the above application software after being increased in security.

Although the technique described in BACKGROUND is convenient since original documents can be saved as digital files and edited on a PC or the like in the manner described previously, saving of some original documents as editable digital files is unfavorable. For example, if an original document containing a word indicating high confidentiality, such as "Internal Use Only" or "Confidential", is saved as a digital file freely editable by anyone, its security is at high risk of failing to be ensured.

Unlike the above, in this embodiment, image data obtained by scanning can be converted to a highly versatile data format after its security is ensured.

Figure 6:
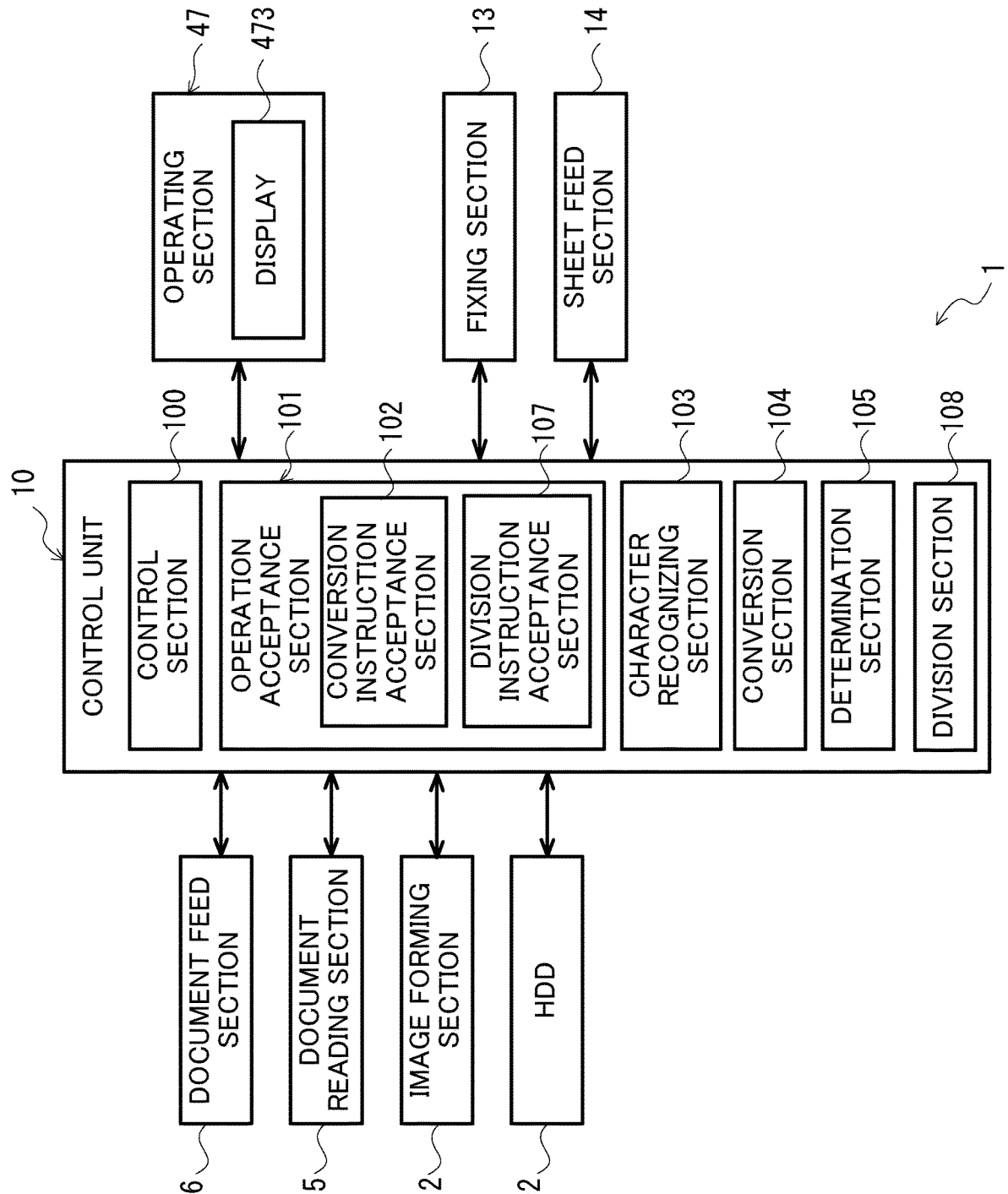
FIG. 6 is a functional block diagram schematically showing an essential internal configuration of an image forming apparatus as one embodiment of an image processing apparatus according to a second embodiment of the present disclosure.

FIG. 6 is a functional block diagram schematically showing an essential internal configuration of an image forming apparatus as one embodiment of an image processing apparatus according to a second embodiment of the present disclosure. The image forming apparatus according to the second embodiment is different from the image forming apparatus 1 shown in FIG. 1 in that the operation acceptance section 101 includes a division instruction acceptance section 107 and the control unit 10 includes a division section 108. In the following description, further explanation of the same structure as shown in FIG. 1 will not be omitted.

The control unit 10 functions as the control section 100, the operation acceptance section 101, the character recognizing section 103, the conversion section 104, the determination section 105, the division instruction acceptance section 107, and the division section 108 by the operation in accordance with a second control program stored in the HDD 92. However, each of the above-mentioned control section 100 and other sections may not be implemented by the operation of the control unit 10 in accordance with the control program but may be constituted by a hardware circuit. Hereinafter, the same applies to the other embodiment unless otherwise stated.

The division instruction acceptance section 107 accepts a division instruction input by user's operation of the operating section 47 to divide image data obtained by reading of an image by the document reading section 5 into a plurality of files.

When the division instruction acceptance section 107 accepts the above division instruction, the division section 108 divides the image data obtained by reading of the image by the document reading section 5 into a plurality of files according to the division instruction.

For example, suppose that, as shown in FIG. 2A, in allowing the document reading section 5 to read an original document of five pages D1 to D5, the division instruction acceptance section 107 has accepted a division instruction to divide the read image data into two files, one containing the first three pages and the other containing the remaining two pages. In this case, the division section 108 divides the image data on the original document pages D1 to D5 obtained by reading by the document reading section 5 into a file for image data on the original document pages D1 to D3 and another file for image data on the original document pages D4 and D5.

When the division section 108 divides the image data obtained by reading of the image by the document reading section 5 into a plurality of files, the determination section 105 determines, for each of the files into which the image data has been divided by the division section 108, whether or not a text represented by the recognition result of the character recognizing section 103 contains the keyword.

Furthermore, as for the file about which the determination section 105 has determined that the text contains the keyword, the conversion section 104 converts the image data obtained by reading of the image by the document reading section 5 to data available within the application software and taking a limitedly editable format. On the other hand, as for the file about which the determination section 105 has determined that the text does not contain the keyword, the conversion section 104 performs the above conversion in a freely editable format.

Figure 7A:
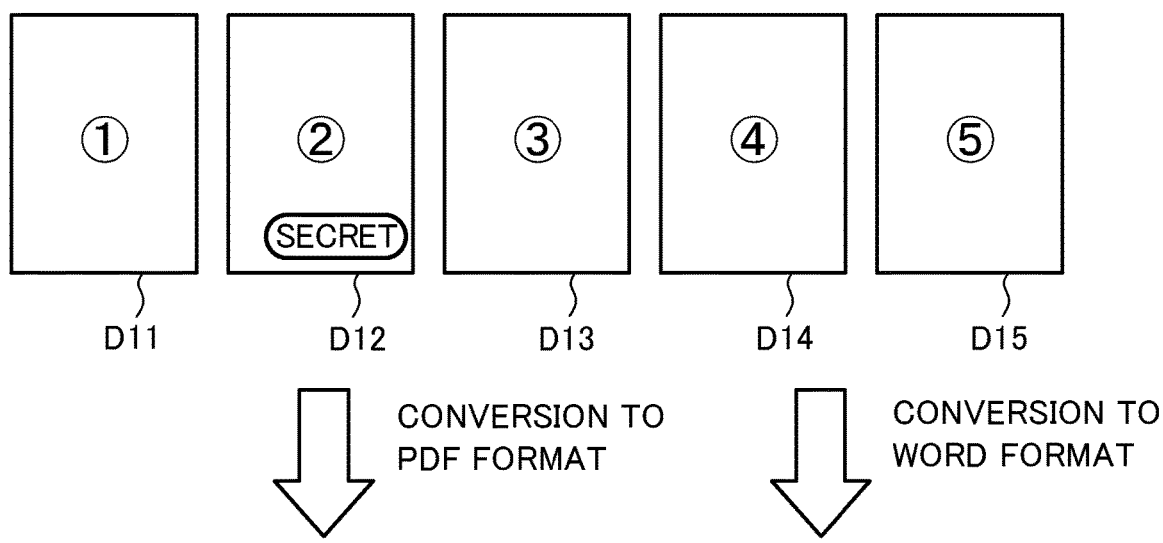
Figure 7B:
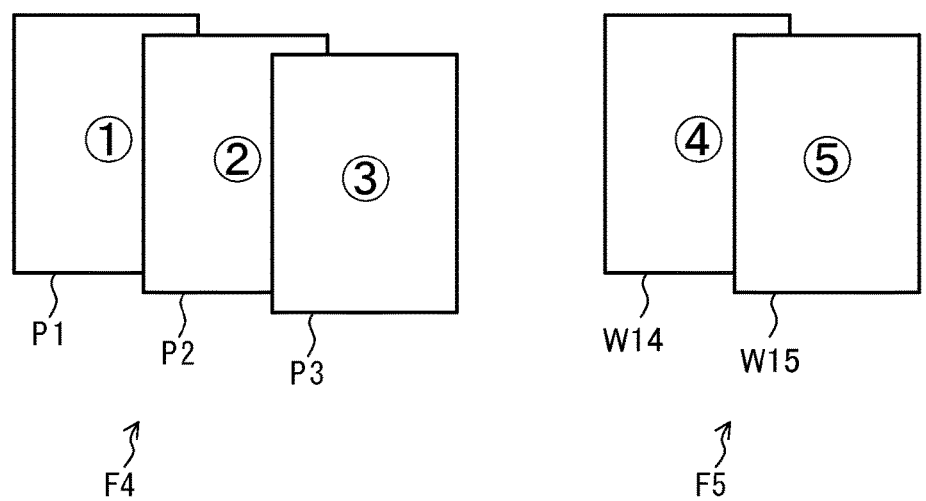

For example, suppose that, as shown in FIG. 7A, in allowing the document reading section 5 to read an original document of five pages D11 to D15 in which the second original document page D12 contains a word "Secret", the conversion instruction acceptance section 102 has accepted a user's conversion instruction for conversion to data in Word format and the division instruction acceptance section 104 has accepted a user's division instruction to divide the read image data into a file containing the first three pages and a file containing the remaining two pages. In this case, as shown in FIG. 7B, the conversion section 104 converts, as for the image data on the first three original document pages D11 to D13 obtained by reading by the document reading section 5, the image data to data in PDF format. Thus, PDF documents P1 to P3 are created as a single file F4.

As for the image data on the remaining two original document pages D14 and D15, the conversion section 104 converts it to data in Word format. Thus, Word texts W14 and W15 are created as a single file F5. The control section 100 saves these files F4 and F5 on the HDD 92.

In still another embodiment, in the case where an original document read by the document reading section 5 has a plurality of pages, the determination section 105 determines, for each page, whether or not a text represented by the recognition result of the character recognizing section 103 contains such a keyword as described above.

In this case, as for the page about which the determination section 105 has determined that the text contains the keyword, the conversion section 104 converts image data obtained by reading of an image by the document reading section 5 to data available within the application software and taking a limitedly editable format. On the other hand, as for the page about which the determination section 105 has determined that the text does not contain the keyword, the conversion section 104 performs the above conversion in a freely editable format.

Figure 8A:
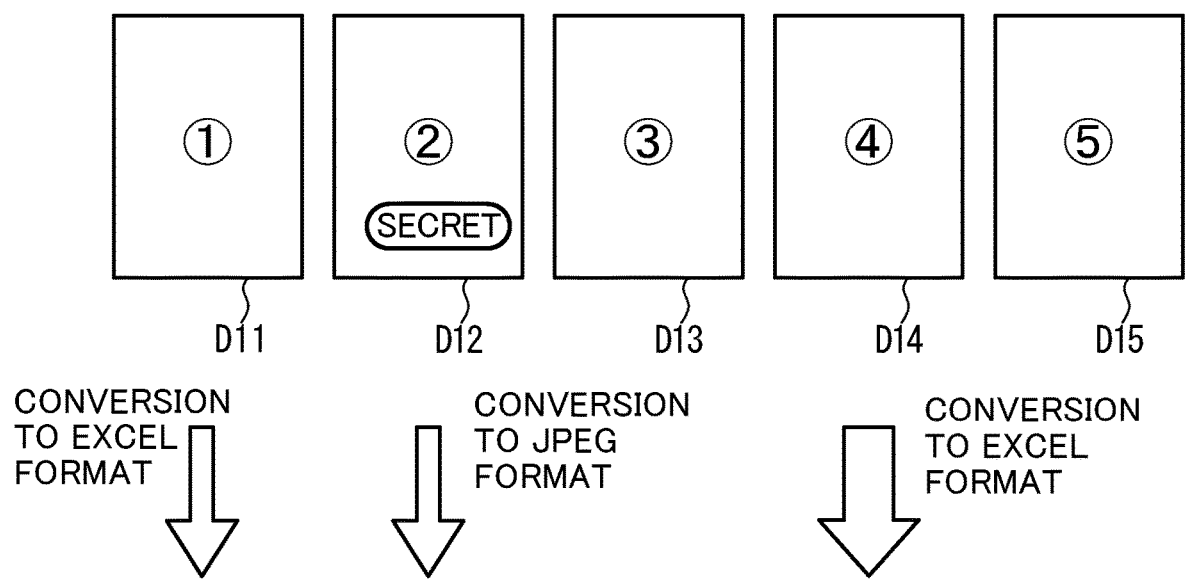
Figure 8B:
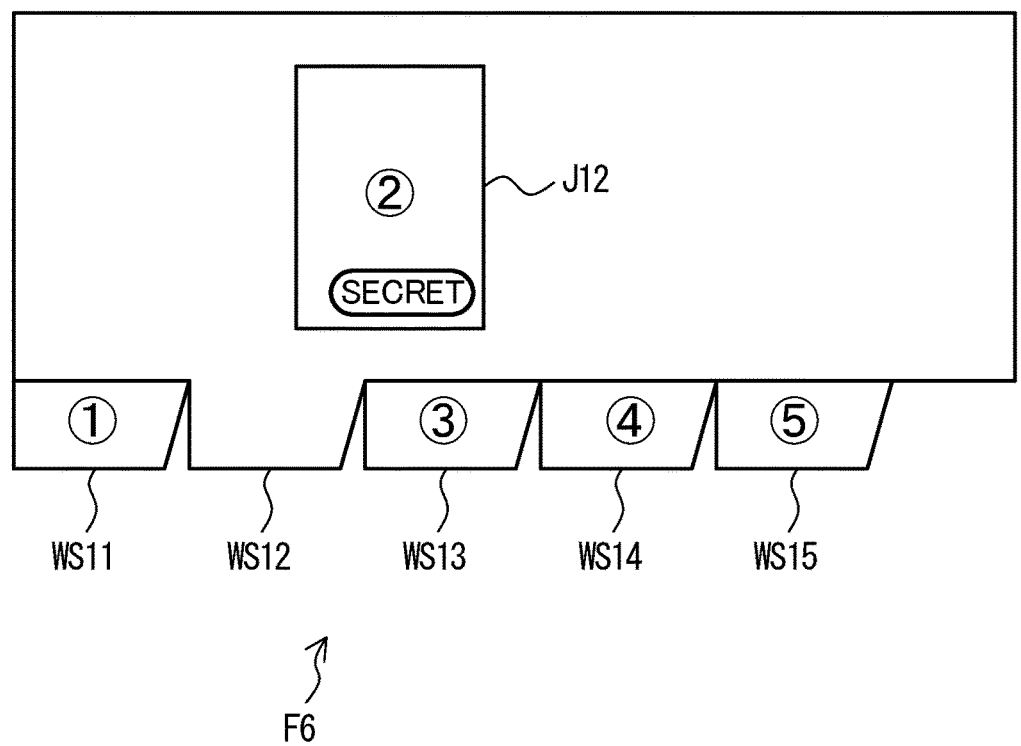

For example, suppose that, as shown in FIG. 8A, in allowing the document reading section 5 to read an original document of five pages D11 to D15 in which the second original document page D12 contains a word "Secret", the conversion instruction acceptance section 102 has accepted a conversion instruction for conversion to data in Excel format. In this case, as shown in FIG. 8B, the conversion section 104 converts, as for the second original document page D12, image data on the original document page D12 to data in Jpeg format.

Furthermore, the conversion section 104 converts the first and third to fifth original document pages D11 and D13 to D15 to data in Excel format and puts worksheets WS11 to WS15 of an Excel document into a single file F6. In doing so, the conversion section 104 creates a worksheet WS12 as a blank and attaches the converted image J12 in Jpeg format to the worksheet WS12. The control section 100 saves the file F6 on the HDD 92.

The present disclosure is not limited to the above embodiments and can be modified in various ways. Although the description of the above embodiments is given taking a multifunction peripheral as an example of the image processing apparatus according to the present disclosure, the example is merely illustrative and the image processing apparatus may be any other image processing apparatus having, for example, a copy function, a facsimile function, a scan function or others.

The structures, configurations, and processing shown in the above embodiments with reference to FIGS. 1 to 8B are merely illustrative of the present disclosure and the present disclosure is not intended to be limited to the above structures, configurations, and processing.

While the present disclosure has been described in detail with reference to the embodiments thereof, it would be apparent to those skilled in the art the various changes and modifications may be made therein within the scope defined by the appended claims.

What is claimed is:

1. An image processing apparatus comprising:
a document reading section that optically reads an image from an original document being fed or placed on a platen glass;
an operating section that accepts an instruction form a user, the operating section including a touch panel; and
a control unit including a processor,
wherein the control unit functions, when the processor executes a control program, as:
a conversion instruction acceptance section that accepts a conversion instruction to convert data to data in a freely editable format through the operating section from the user;
a character recognizing section that preforms processing for subjecting image data obtained by reading of the image by the document reading section to character recognition;
a conversion section that performs, using a recognition result of the character recognizing section, conversion of the image data obtained by reading of the image by the document reading section to data available within predetermined application software, the data being the data in the freely editable format specified by the conversion instruction accepted by the conversion instruction acceptance section; and
a determination section that determines whether or not a text represented by the recognition result of the character recognizing section contains a predetermined keyword,
wherein, when the determination section determines that the text does not contain the predetermined keyword, the conversion section performs the conversion of the image data to the data in the freely editable format specified by the conversion instruction accepted by the conversion instruction acceptance section, whereas when the determination section determines that the text contains the predetermined keyword, the conversion section performs the conversion of the image data to the data in a limitedly editable format accepted through the operating section from the user, not in the freely editable format accepted by the conversion instruction acceptance section.

2. The image processing apparatus according to claim 1, wherein when the determination section determines that the text contains the predetermined keyword, the conversion section converts the image data obtained by reading of the image by the document reading section to read-only data, as the data in the limitedly editable format.

3. The image processing apparatus according to claim 1, wherein when the determination section determines that the text contains the predetermined keyword, the conversion section converts the image data obtained by reading of the image by the document reading section to data for which a password is set.

4. The image processing apparatus according to claim 1, wherein the predetermined keyword is a sequence of characters that means a request for confidentiality.

5. The image processing apparatus according to claim 1, wherein the control unit further functions, when the processor executes the control program, as a division section that divides the image data obtained by reading of the image by the document reading section into a plurality of files, when the division section divides the image data obtained by reading of the image by the document reading section into the plurality of files, the determination section determines, for each of the files into which the image data has been divided by the division section, whether or not a text represented by the recognition result of the character recognizing section contains the predetermined keyword, as for the file about which the determination section has determined that the text contains the predetermined keyword, the conversion section performs the conversion of the image data to the data in the limitedly editable format, and as for the file about which the determination section has determined that the text does not contain the predetermined keyword, the conversion section performs the conversion of the image data in the freely editable format.

6. The image processing apparatus according to claim 1, wherein if the original document read by the document reading section has a plurality of pages, the determination section determines, for each of the pages, whether or not a text represented by the recognition result of the character recognizing section contains the predetermined keyword, as for the page about which the determination section has determined that the text contains the predetermined keyword, the conversion section performs the conversion of the image data to the data in the limitedly editable format, and as for the page about which the determination section has determined that the text does not contain the predetermined keyword, the conversion section performs the conversion of the image data in the freely editable format.

* * * * *